United States Patent
Brandt et al.

(10) Patent No.: US 9,210,940 B2
(45) Date of Patent: Dec. 15, 2015

(54) RYE FLOUR IMITATION

(75) Inventors: Markus Brandt, Minden (DE); Gina Jaspers, Minden (DE)

(73) Assignee: Ernst Böcker GmbH & Co. KG, Minden/Westf (DE)

( * ) Notice: Subject to any disclaimer, the term of this patent is extended or adjusted under 35 U.S.C. 154(b) by 144 days.

(21) Appl. No.: 13/700,419

(22) PCT Filed: May 31, 2011

(86) PCT No.: PCT/EP2011/058961
§ 371 (c)(1),
(2), (4) Date: Feb. 11, 2013

(87) PCT Pub. No.: WO2011/151331
PCT Pub. Date: Dec. 8, 2011

(65) Prior Publication Data
US 2013/0129864 A1 May 23, 2013

(30) Foreign Application Priority Data

May 31, 2010 (DE) .................. 10 2010 017 171

(51) Int. Cl.
| | |
|---|---|
| A21D 10/00 | (2006.01) |
| A21D 13/04 | (2006.01) |
| A21D 2/18 | (2006.01) |
| A21D 2/26 | (2006.01) |
| A21D 2/36 | (2006.01) |
| A21D 8/04 | (2006.01) |
| A21D 13/06 | (2006.01) |
| A23L 1/29 | (2006.01) |

(52) U.S. Cl.
CPC ............ *A21D 10/005* (2013.01); *A21D 2/186* (2013.01); *A21D 2/262* (2013.01); *A21D 2/263* (2013.01); *A21D 2/266* (2013.01); *A21D 2/362* (2013.01); *A21D 8/045* (2013.01); *A21D 10/002* (2013.01); *A21D 13/04* (2013.01); *A21D 13/066* (2013.01); *A23L 1/29* (2013.01)

(58) Field of Classification Search
CPC ... A21D 10/005; A21D 13/066; A21D 13/04; A21D 2/186; A21D 13/08; A21D 2/366; A21D 8/00; A21D 2/36; A21D 8/045; A21D 2/183; A21D 10/002; A21D 2/266; A21D 10/04; A21D 8/06; A23L 1/214; A23L 1/2142; A23L 1/2145; A23L 1/3055; A23L 1/3081; A23L 1/05; A23L 2/52; A23L 1/0526; A23L 1/31436; A23L 1/16; A23L 1/172; A23L 1/308; A23V 2250/5044; A23V 2002/00; A23V 2250/5118; A23J 3/16; A23G 9/42; A23K 1/14; A23C 20/005
USPC .......... 426/550, 21, 62, 55, 61, 549, 496, 94, 426/555, 523, 578, 629, 634
See application file for complete search history.

(56) References Cited

FOREIGN PATENT DOCUMENTS

| | | | |
|---|---|---|---|
| DE | 35 35 412 A1 | 4/1987 | |
| EP | 0 035 978 A2 | 9/1987 | |
| IT | WO2008010252 | * 1/2008 | ............... A21D 8/04 |
| WO | WO 2006/107809 A1 | 10/2006 | |
| WO | WO 2011/039308 A2 | 4/2011 | |
| WO | WO 2011/062507 A1 | 5/2011 | |

OTHER PUBLICATIONS

Casier, J. P. J., et al. 1979. Tropical Foods. 1: 279-340.*
Earle, F. R. et al. 1968. Compositional Data on Sunflower Seed. pp. 876-879.*
Dev, D. K. et al. 1988. J. Food Sci. 53: 1835-1837.*
Moroni, Alice V., et al., "Sourdough in gluten-free bread-making: An ancient technology to solve a novel issue?" Food Microbiology, 2009, pp. 676-684, vol. 26.
Ribotta, Pablo D. et al., "Production of gluten-free bread using soybean flour" Journal of the Science of Food and Agriculture J Sci Food Agric, 2004, pp. 1969-1974, vol. 84.
Schober, Tilman J. "Manufacture of Gluten-Free Specialty Breads and Confectionery Products" Gluten-Free Food Science and Technology, May 1, 2009, pp. 130-178, Chapter 9.
Sciarini, Lorena S. et al., "Influence of Gluten-free Flours and their Mixtures on Batter Properties and Bread Quality" Food Bioprocess Technol, 2010, pp. 577-585, vol. 3.
"Römpp Lexikon Lebensmittelchemie" G. Eisenbrand, P. Schreier, Jan. 1, 1995, p. 644, XP-002657921.
"The Carbohydrates" Baking Science & Technology, Jan. 1, 1988, pp. 36-38, XP-002657920.
"Glutenfreies vegans Backen" Jun. 29, 2007, p. 1, XP-002657919.
"Schokoladenkuchen, glutenfrei—Backmishung-Test" May 21, 2009, pp. 1-2, XP-002657918.
International Search Report for PCT/EP2011/058961 dated Sep. 14, 2011.
Codex Alimentarius Commission, Distribution of the Report of the 29th Session of the Codex Committee on Nutrition and Foods for Special Dietary Uses (ALINORM 08/31/26), Joint FAO/WHO Food Standards Programme, Nov. 2007.
Guilloux, Karine, et al. "Production of arabinoxylan-oligosaccharides from flaxseed (*Linum usitatissimum*)." Journal of agricultural and food chemistry 57.23 (2009): 11308-11313.

\* cited by examiner

*Primary Examiner* — Hamid R Badr
(74) *Attorney, Agent, or Firm* — Knobbe Martens Olson & Bear LLP

(57) ABSTRACT

A gluten-free baking mix comprising at least one gluten-free starch source and at least one gluten-free pentosan source, wherein the ratio of starch to pentosan corresponds to 8:1 to 30:1 and the pentosan source is selected from synthetically produced pentosans, pentosans purified from plant parts, ground oil seeds, particularly corn oil pressing residues, rapeseed oil pressing residues, sunflower oil pressing residues and linseed oil pressing residues, ground plant parts having a high pentosan content, particularly corn husks, corn bran, rice husks, sunflower seeds, linseed, hempseed, soy flour, coffee bean flour and carrot flour, and from ground oil plant parts having a high pentosan content and mixtures thereof is disclosed herein.

10 Claims, 4 Drawing Sheets

RYE FLOUR IMITATION

CROSS REFERENCE TO RELATED APPLICATIONS

This application is a U.S. National Phase Application of PCT International Application Number PCT/EP2011/058961, filed on May 31, 2011, designating the United States of America and published in the German language, which is an International Application of and claims the benefit of priority to German Patent Application No. 10 2010 017 171.9, filed on May 31, 2010. The disclosures of the above-referenced applications are hereby expressly incorporated by reference in their entireties.

The present invention relates to the field of food production, in particular to the preparation and provision of gluten-free baked products and bread.

Celiac disease, also referred to as non-tropical or endemic sprue or gluten-sensitive enteropathy, is one of the most commonly occurring forms of food intolerance, or more specifically a disease in which the body of the affected patient mounts an immunological response to gluten, i. e. for example to the gliadin fraction of wheat and/or the prolamin fraction of rye (secalin) and/or the hordein fraction of barley. This response to the ingestion of gluten manifests itself in the form of an inflammation of the intestine and the destruction of the intestinal epithelial wall and thus results in a resorption disorder.

The only form of therapy that is currently available is a lifelong and complete avoidance of gluten. Complete avoidance of gluten or gluten proteins results in an amelioration of the inflammation and a regeneration of the epithelia of the intestinal wall. This complete avoidance keeps celiac disease patients from ingesting the most common food products made of wheat flour, such as pasta, bread and baked goods, and they are forced to restrict themselves to food products made of pseudocereals, i. e. plants that are not closely related to wheat, such as sorghum, millet, annual bunch grass, finger millet and tear grass, buckwheat, amaranth and quinoa. As already the smallest gluten contaminations in food products have extreme effects on celiac disease patients, it is important to provide an exact definition of "gluten-free" for the production of gluten-free food products and to comply with corresponding guidelines in the production of baked goods.

The Codex Alimentarius Commission of the World Health Organization (WHO) and the Food and Agricultural Organization (FAO) have therefore set a standard for the use of the term "gluten-free". According to this standard, the label "gluten-free" applies to: (a) food products consisting of or produced with the exclusive use of raw materials that do not contain any prolamins of wheat or other *Triticum* species, such as spelt (*Triticum spelta* L.), kamut (*Triticum polonicum* L.) or durum wheat, rye, barley, oat or hybrids thereof having a gluten content of less than 20 ppm, (b) food products consisting of raw materials obtained from wheat, rye, barley, oat, spelt or hybrids thereof, which may be referred to as gluten-free if their gluten content has been reduced to less than 20 ppm by corresponding processing steps.

The European Commission has substantially followed the suggestions made by the Codex Alimentarius Commission and has adopted said limit values in Regulation No. 41/2009. According to this regulation, food products made from wheat, rye, barley or oat or hybrids thereof, which have been treated by a method for reducing the gluten content, are allowed to be labeled as having a "very low gluten" content, provided the gluten content is <100 ppm.

Within the scope of the present invention as described in the following, the term "gluten-free" is to be understood according to this definition.

Gluten is a storage protein found in wheat flour and contains the protein fractions glutenin and gliadin. When processed in doughs, gluten exhibits cohesive, elastic and viscous properties and forms a matrix that determines the major characteristics of doughs (extensibility, tensile strength, mixing tolerance, gas retention and binding capacity) and encapsulates the starch granules and dietary fibers. Flour absorbs water mainly through said proteins gliadin and glutenin. The protein matrix is extended by shearing forces that occur in the kneading process and, together with swelling and dissolving processes, structural changes in the proteins take place. Strands of glutenin and gliadin are elongated and inter- and intramolecular bonding at the branching points of these strands results in the formation of a continuous three-dimensional protein matrix and thus in gluten formation. In the optimally kneaded dough, this matrix represents the predominant structural element and substantially contributes to the gas retaining capacity and fermentation tolerance of the dough. Starch particles are embedded in the gluten matrix and are transported by the kneading process to form a continuous, adhesive structure. Heating during the baking process enhances the dissolution of amylose and amylopectin, while the particles are simultaneously diffused by water until they are finally torn apart. The interaction of denatured proteins and swollen, partially gelatinized starch leads to the formation of a stable crumb framework in the baking process.

However, the omission of gluten, in particular in the production of corresponding gluten-free baked goods, poses a technological problem. In this context, the production of gluten-free bread represents the greatest challenge as wheat gluten takes over multiple functions in the successful bread production process and can therefore only be replaced by using a plurality of additives.

For instance, gluten-free bread has already been produced on the basis of rice flour. Rice flour is suitable as a flour substitute, in particular due to its unobtrusive taste, white color, hypoallergenic properties and good tolerability. However, the hydrophobic and insoluble proteins contained in rice flour hardly have any viscoelastic properties to allow for the formation of a protein framework and thus to constitute a gas retaining capacity in the yeast-containing, kneaded dough. Therefore, rice bread does not have a soft and fluffy texture but is rather compact and very firm.

For improving the quality of bread, document JP 2003-169593A proposes a method for the production of bread, wherein gluten-free flour is admixed with a treated gluten extract or treated wheat flour, which has completely or substantially lost its allergenic properties due to said treatment, in order to achieve the desired glutinous properties in the bread dough. The ingestion of such bread, however, is problematic for celiac disease patients.

Alternatively, the results of baking bread, not only on a rice flour basis, may be improved by the addition of texture-enhancing agents, such as hydrocolloids, xanthan gum, carboxymethyl cellulose (CMC), hydroxypropyl methylcellulose (HPMC) (e. g. US 2010/0021610 A1), pectin, guar gum, carob bean gum or agarose.

It should be noted, however, that the addition of hydrocolloids merely alters the water binding properties of the dough, so that a larger amount of water has to be added to the dough which is then absorbed by the starch in the baking process. The increased addition of water renders the dough more liquid, so that it can only be baked in pans. Even though such additions render the rice bread juicier, the addition of hydrocolloids does not facilitate the formation of a structure that is capable of retaining gas and yields fluffy bread with a crumb. Instead, the result is rather cake-like and thus still has properties insufficient for bread, e. g. a dissatisfactory mouthfeel and in some cases also a substantial adverse effect on taste.

Document WO 2008/022092 discloses the addition of various texture-improving and gas-retaining polymers, both natural and synthetic, which are intended to better simulate the glutinous properties of wheat and thus to improve the production of gluten-free products. Even though such additives would render gluten-free products fluffier, the products would still retain the above-mentioned properties insufficient for bread, e. g. a dissatisfactory mouthfeel and in some cases also a substantial adverse effect on taste. Moreover, the addition of such polymers is comparatively expensive and not fully accepted by consumers.

In view of the above-described drawbacks, there is still a need for improving the production methods and compositions for the production of high-quality, gluten-free baked goods. In particular, there is a need for producing gluten-free bread with a fluffy texture and a firm crumb that produces a satisfactory mouthfeel and has a good taste.

The present inventors have thus taken on the task of providing compositions for the production of high-quality, gluten-free baked goods, in particular bread, with improved bread properties, a fluffy texture and a juicy crumb that produce a satisfactory mouthfeel and can furthermore be produced as free-form loaves.

It was taken into account that rye proteins, in contrast to wheat proteins, are not capable of forming such a glutinous framework. In rye flour bread, water binding and dough formation occur through pentosans. In addition to the numerous available recipes for imitating baked goods prepared from wheat with the aid of hydrocolloid additives, it was the present inventors' objective to provide a gluten-free flour mix that is technologically comparable to rye flour.

The present invention thus provides a gluten-free baking mix containing at least one gluten-free starch source and at least on gluten-free pentosan source. Ideally, the ratio of starch to pentosan is at least 8:1.

Baking mixes are usually made of flour and further additives. Within the scope of the present application, numerous references are made to ingredients of the baking mix without explicitly stating in each case that these are "ground" ingredients, i. e. ingredients that have been ground to flour.

The present invention thus aims to achieve a degree of grinding of the employed ingredients, and in particular of the pentosan source, corresponding to fine grinding to a particle size of <500 μm as this will accelerate water absorption. Embodiments, wherein 50% of the ingredients are present as fine-ground particles of <500 μm and the other 50% as fine-ground particles of >500 μm yield end products compliant with the criteria of the present invention. According to further embodiments of the gluten-free baking mix, the ratio of starch to pentosan corresponds to at least 8:1, at least 10:1, at least 15:1, at least 20:1, at least 25:1 and/or at least 30:1. Baking mixes having a ratio of starch to pentosan of 8:1 will develop highly spongy textures in the baking process due to the formation of a stable, gas-retaining matrix. In case of an inappropriate baking process, however, the crumb may be lifted too high and thus be separated from the crumb. Baking mixes having a ratio of starch to pentosan between 10:1 and 15:1 are ideal and thus preferred as they provide a fluffy, yet fine-pored and compact bread texture with a crumb that is firm to the bite and remains connected to the crust of the loaf. Baking mixes having a ratio of starch to pentosan between 20:1 and 30:1 will develop a highly fluffy and large-pored bread texture resembling that of wheat bread.

In order to ensure the absence of gluten and to eliminate any potential risk for celiac disease patients as well as to define the term "gluten-free" within the scope of the present invention, it is established that the starch or pentosan sources contained in the mix of the present invention, according to the Codex Alimentarius Commission of the World Health Organization (WHO) and the Food and Agricultural Organization (FAO), have a maximum gluten content of 20 ppm. However, the term "gluten-free", as used in the present invention, also includes the use of processed starch or pentosan fractions from wheat, rye or barley which have been processed in such a way that no gluten is detectable in the sense of the above definition.

Within the scope of the present application, the term "starch" refers to plant polysaccharides consisting of D-glucose units that are linked via glycosidic bonds. About 20 to 30% of starch consist of amylose, i. e. linear chains having a helical (spiral) structure with only α-1,4-glycosidic linkages, and the other 70 to 80% consist of amylopectin, i. e. highly branched structures having α-1,6- and α-1,4-glycosidic linkages.

According to further embodiments, at least one starch source is selected from the group consisting of ground corn starch, potato starch including sweet potato starch, rice starch, pea starch, manioc starch (tapioca, cassava), sorghum starch, arrowroot starch, sago starch and mixtures thereof.

In nature, the utilized parts of the corresponding crude plant contain the following starch concentrations: rice contains 89% starch, potatoes contain 82% starch, corn contains 71% starch, manioc contains 77% starch, peas contain 40% starch, sorghum contains 74% starch.

Methods for controlling the starch content of a starting product or of mixtures of starting products as well as of the baking mix are known to the person skilled in the art, see e. g. AOAC Method No. 996.11, AACC 76.13, ICC Standard method No. 168, by which the starch content of a product may be determined. On the basis of the starch content as measured or calculated, the baking mix of the present invention in the preferred composition thereof can be weighed in from each starting product according to the respective ratio of starch to pentosan.

Within the scope of the present application, the term "pentosan" refers to hemicelluloses consisting of arabinose and xylose, which may also be referred to as arabinoxylans. Arabinoxylans consist of a linear chain of β-(1→4) glycosidically linked xylose units, mostly having α-L arabinose residues at position(s) 2 and/or 3. Also naturally occurring are pentosans built from β-(1→3) and β-(1→6) linked galactose units as well as small amounts of highly branched arabinogalactans. Pentosans are present in many plant parts, but mainly in the outer layers of the grains. Rye contains 6 to 8% pentosan and wheat contains 2 to 3% pentosan.

According to further embodiments, at least one pentosan source is provided that is selected from the group consisting of synthetically produced pentosans, pentosans purified from plant parts and ground plant parts having a high pentosan content, e. g. corn husks, corn bran, corn oil pressing residues, rapeseed oil pressing residues, rice husks, sunflower seeds, sunflower oil pressing residues, pumpkin seeds, pumpkin seed oil pressing residues, linseed, linseed oil pressing residues, hempseed, soy flour, quinoa flour and bran, amaranth flour, sorghum flour, coffee bean flour and carrot flour.

According to a further embodiment, defatted flour produced from the pressing residues of seeds used in oil production, so-called oil seeds, and/or oil plants, such as sunflower seeds, corn kernels, linseed, hempseed, pumpkin seeds, coffee beans or soy beans, is employed as a pentosan source in the baking mix according to the present invention.

It can be taken from the literature that each crude plant contains the following pentosan concentrations in the utilized plant parts thereof: corn contains 35% pentosan, rice husks contain 17% pentosan, linseed (defatted) contains 22% pentosan, coffee contains 11.5% pentosan and soy (defatted) contains 6.9% pentosan.

The pentosan content of the crude plants can also be determined by means of methods known in the art, e. g. as described in Hashimoto et al. 1987 (Cereal Chemistry 64, p. 30-34). However, the present inventors have found substantial differences between the pentosan contents as measured and the values indicated in the literature. In the following, the theoretical pentosan content (as stated in the literature) and the pentosan content actually present in the baking mix will be indicated in each case.

On the basis of the calculated pentosan content, the baking mix of the present invention in the preferred composition thereof can be weighed in from each starting product according to the respective ratio of starch to pentosan.

According to one embodiment, the baking mix of the present invention therefore has a calculated total content of 2.5 to 25% pentosan, which corresponds to an absolute amount of at least 25 g to 250 g pentosan per kg baking mix. In order to obtain the calculated total content of 25% pentosan, it is required to admix corresponding amounts of isolated and purified pentosan in addition to the natural pentosan-containing raw materials.

In this context it should be noted that there are great variations among the various publications with respect to the amounts of pentosan naturally contained in the raw materials. The more recent the publication is, the lower is the pentosan content indicated for comparable raw materials.

In order to illustrate this discrepancy, the experimental results were compared with respect to the pentosan contents as calculated and as measured. Thus, according to a further embodiment, wherein the baking mix is based on results obtained with the Hashimoto method for measuring the pentosan content, the baking mix as claimed contains at least 0.25% pentosan, preferably 0.25 to 1% pentosan and also preferably 1 to 2.5% pentosan per kg baking mix.

The experiments conducted by the present inventors have shown that a good or very good development of the dough volume could already be achieved with an actually measured pentosan content of 0.25%, which is comparable to a calculated pentosan content of 2.5% (also see FIG. 6), thus yielding a fluffy bread producing a pleasant mouthfeel. At this pentosan content, bread can already be baked as free-form loaves.

Increasing the pentosan content to up to 1% (as measured), which is comparable to a calculated amount of about 9 to 10%, does not further improve the development of the specific volume. However, pentosan contents of 1% to 2.5% (as measured), which is comparable to a calculated content of about 9% to 22%, lead to a further increase of the water absorption and water retaining capacity of the dough and thus produce a mouthfeel of juicy and therefore fresh bread. Bread with this pentosan content can also be baked as free-form loaves.

At a measured pentosan content of more than 2.5%, which is comparable to more than 25% as calculated, the resulting bread will conglomerate and stick to the gum in an unpleasant manner owing to its further increased water retaining capacity.

According to further embodiments, a baking mix is provided which, in addition to adjusting the ratio of starch to pentosan between 8:1 and 30:1, is adjusted such that preferably at least 25%, also preferably 25 to 30%, also preferably 30 to 35%, also preferably 35 to 40%, also preferably 40 to 50% and also preferably 50 to 70% of starch can be detected in the flour. The detection of the total starch content can be performed using methods known in the art, e. g. according to AOAC Method No. 996.11, AACC 76.13, ICC Standard Method No. 168.

While it is also possible to bake bread according to recipes with a ratio of starch to pentosan of 8:1 and only 10% total starch content, the bread thus obtained does not exhibit a sufficient increase in volume during the fermentation period, which renders its texture too compact. A total starch content of 25% and more, in combination with the ratio of starch to pentosan according to the present invention will yield fluffy bread with a juicy crumb and a sensorially pleasant texture.

According to a further embodiment, the gluten-free baking mix additionally contains at least one gluten-free protein source. Preferably, said gluten-free protein source is added in an amount that will result in a protein content of 5% to 10% in the final baking mix and/or the final baked goods.

The protein content of a starting product, the baking mix and/or the final baked goods can be determined or detected using methods known in the art, e. g. the determination of nitrogen according to Kjeldahl (ICC Standard 105/1, ICC-International Association for Cereal Science and Technology, Vienna, Austria) or Dumas (ICC Standard 167). The proportion of the protein source to be weighed in can thus easily be calculated by a person skilled in the art.

According to further embodiments, at least one protein source selected from the group consisting of ground lupines, ground chickpeas, ground beans and ground field beans, milk powder, whey powder, powdered egg or mixtures thereof is added. The added protein source enhances structure formation and therefore the gas retaining capacity of the dough and the baked good prepared therefrom.

For the baking mix according to the present invention, the ingredients thereof, i. e. the selected pentosan source, the selected starch source and optionally also the selected protein source, which are all present as ground flour, are mixed in a dry state. In particular the pentosan source should have a degree of fine grinding with a particle size of <500 μm as this leads to accelerated water absorption. According to a preferred embodiment, the ground flour of the selected pentosan source is present in the form of defatted linseed having a degree of fine grinding with a particle size of <500 μm. According to this preferred embodiment, the ground flour of the selected starch source, e. g. corn starch or potato starch, is further present as fine-ground particles of <400 μm. According to this preferred embodiment, the ground flour of the selected protein source, e. g. beans, is further present as fine-ground particles of <500 μm.

According to the method for the production of gluten-free baked goods and bread, the baking mix is initially mixed with salt, yeast and water. Usually, allowing variations at the discretion of a person skilled in the art, about 1.5% to 3% of salt and 2% to 5% of yeast are added to the baking mix. The dough is mixed in a spiral kneader, e. g. for 5 minutes, and is shaped into loaves of usually 1,000 g each after 3 minutes of resting. Alternatively it is also possible to prepare softer doughs with a higher dough yield, which are then baked in a loaf pan. Typically, such pan loaves are baked for 60 minutes at an initial temperature of 240° C. and subsequently at 210° C. Moreover, the person skilled in the art of baking is familiar with alternative dough preparations and baking protocols, e. g. using a microwave oven.

With the use of sourdough in addition to or instead of yeast as a baking agent, up to 40% by weight of the flour mixture can be employed in the form of sourdough. Furthermore, a fermentation time protocol of usually 12 to 24 hours, preferably 16 to 18 hours, at usually 22° C. to 30° C., preferably at 25° C. to 28° C., was followed.

Sourdough is a mixture that is usually prepared from flour and water and fermented with lactobacilli. Within the scope of the present application, the sourdough is prepared from gluten-free flours, wherein the use of the above-mentioned pentosan sources or mixtures thereof is preferred. Subsequently, the mixture of flour and water is admixed with a sourdough starter culture which preferably, but not exclusively, contains lactobacilli selected from the group of *Lactobacillus plantarum, L. fermentum, L. paracasei, L. paralimentarius, L. helveticus, Leuconostoc argentinum* and *Saccharomyces pastorianus*.

With adjusting the ratio of pentosan to starch of the baking mix of the present invention according to claim 1, it is already obvious when mixing and kneading the doughs prepared from the baking mix of the present invention that it is possible to prepare a dough that is capable of initially binding the water and then (mainly during the baking process) slowly releasing it to the binding starch, even without the addition of hydrocolloids. In this way it is achieved that, even without the protein proportion, a structure is formed that is capable of retaining gases formed in the fermentation process and thus provides a fluffy and juicy composition of the bread. The bread thus obtained is characterized in that it has an improved, firm crumb and can therefore clearly be distinguished from known gluten-free products made of pseudocereals, which are mostly cake-like.

This fluffy and juicy bread texture is additionally improved by adding a protein source which contributes to the formation of improved, gas-retaining structures during the baking process. The bread thus obtained is even more significantly characterized by an improved, juicy crumb and can therefore clearly be distinguished from known gluten-free products made from pseudocereals, which are mostly cake-like.

This improvement of the bread texture is also objectively measurable. To this end, a Texture Profile Analysis (TPA), i. e. a characterization of the crumb texture, is usually carried out. Based on AACC Method 74-09 (American Association of Cereals Chemists, St. Paul, Minn., USA), parameters characterizing the crumb, such as crumb firmness (N) and crumb elasticity (%), are determined in a penetration test using an aluminum cylinder (diameter 36 mm).

In two cycles conducted at a constant speed of 0.80 mm/sec, the aluminum plunger is driven into a slice of bread having a thickness of 1.6 mm, compresses the slice until a deformation of 20% is achieved and is subsequently drawn back from the slice as far as to the surface thereof. The force (N) required for compression and re-compression of the bread slice is measured and recorded. The data thus obtained are plotted against time (s) in a diagram, thereby creating TPA-characteristic curve progressions which are descriptive of the texture of food products. The force required for compressing the crumb by 20% is herein defined as the crumb firmness.

Compared to commercially available gluten-free baked goods, the baked goods produced according to the present invention exhibit throughout significantly improved crumb properties. They have a rye bread-like crumb and a texture that is softer and more elastic than that of commercially available gluten-free baked goods. Compared to normal rye-wheat bread, the TPA is very similar, although the bread prepared from the baking mix of the present invention is slightly softer than commercially available rye-wheat bread, see for instance FIG. 1.

For producing baked goods, the baking mix of the present invention is mixed with water, salt and at least one baking agent. Within the scope of the present invention, the raw ingredients are generally weighed and put into a spiral kneader. The kneading time is set at a default of about 5 minutes. Unless specifically indicated otherwise, all doughs are slowly kneaded for 5 minutes and subsequently weighed out to give portions of 1,000 g each. The countertop is dusted with starch to prevent the doughs from adhering to the countertop in the rounding process. Upon completion of the fermentation or resting period, the loaves or dough pieces are baked or finished in a baking or microwave oven at the usual baking temperatures and times, wherein a specific bread volume of at least 1.2 ml/g and/or, in case of free-form loaves, a ratio of width to height of at least 1.5 is achieved.

With the use of the above-mentioned baking mixes it is thus possible for the first time to produce gluten-free baked goods that have properties comparable to those of rye bread and rye-wheat bread and can furthermore be produced as free-form loaves.

The term "free-form loaves/bread", as used in the present application and in the art, means that the loaves are not baked in baking pans or other molds, but that the dough pieces are loosely put onto a baking tray or into the oven and baked without any circumferential supporting structures. The quality of the bread texture can most easily be evaluated with free-form loaves. Thus, for instance, dough bleeding during the fermentation period or the baking process indicates an insufficient formation of dough structure and therefore insufficient firmness. In case of wheat, dough bleeding indicates that the glutinous framework has been damaged to such an extent as to cause spreading.

To characterize this quantity, Hoseney (Principles of cereal science, 1986, American Association of Cereal Chemists, St. Paul, Minn., USA) introduced the so-called spread ratio, which is defined as the ratio of width to height of a dough piece.

The specific bread volume is a parameter for characterizing different types of flour. It is calculated from bread volume/bread weight and lies between 1.9 and 2.4 for rye bread and between 3.3 and 3.7 for wheat bread (Belitz-Grosch-Schieberle, Lehrbuch der Lebensmittelchemie, Springer-Verlag, 2001).

to According to a further embodiment, the baked goods prepared in accordance with the present invention have a spread ratio of 1.5 to 3, preferably of 1.8 to 2.5.

According to a further embodiment, it has proved advantageous to employ water-soluble pentosans in the above-mentioned baking mixes and/or to increase the content of water-soluble pentosans in the above-mentioned baking mixes, although both water-soluble and water-insoluble pentosans have a high water binding capacity.

The water solubility of the pentosans is dependent on chain length, degree of substitution and prevailing bonds and is thus altered by enzymatic degradation. For instance, L-arabinofuranosidase cleaves arabinose units, endoxylanase has a depolymerizing effect and xylosidase cleaves xylose starting from the reducing end. The water solubility of pentosans also depends on the degree of cross-linking via diferulates.

It is thus possible to increase the content of water-soluble pentosans in the baking mix utilizing the action of acidic and enzymatic additives, which are either added or, e. g., formed by the addition of sourdough and/or the fermentation with lactic acid bacteria.

According to a further embodiment, pentosan-degrading enzymes selected from the group consisting of xylanase, arabinofuranosidase, endoxylanase and xylosidase are thus added to the above-mentioned baking mixes. As the enzymes are active during both the kneading and resting period and increase the content of water-soluble pentosans, the bread prepared from the baking mix of the present invention is significantly improved, in particular with respect to bread volume.

If, according to a further embodiment, the above-mentioned baking mixes are admixed with sourdough to further increase the content of water-soluble pentosans, it is preferred, but by no means limiting, to employ a sourdough starter culture consisting of, e. g., *Lactobacillus plantarum, L. fermentum, L. paracasei, L. paralimentarius, L. helveticus, Leuconostoc argentinum* and *Saccharomyces pastorianus*.

The baking mix according to the present invention is particularly suitable for being admixed with sourdough or sourdough starters and for being employed in sourdough leavening as known to the person skilled in the art for producing various types of bread.

With the conventional fermentation time of 12 to 24 hours, the state of the pentosans is altered in favor of the water-soluble pentosans, thus yielding a further improvement of the bread prepared from the baking mix of the present invention and, in particular, an improvement with respect to bread volume.

The baked goods prepared from the baking mix according to the present invention significantly differ from commercially available gluten-free products in that they have a truly bread-like character, i. e. with a juicy crumb, an intense taste of bread and a texture comparable to that of rye-wheat bread. Besides the improved bread texture, the gluten-free baked goods produced using sourdough in combination with the baking mix of the present invention are characterized by an improved storability and a more intense taste of bread.

Moreover, the baked goods prepared from the baking mix of the present invention require less addition of water during dough preparation and can be baked without using a baking pan as the person skilled in the art is enabled to adjust the consistency of the dough such that it will not spread or flatten out in the baking process, but can be shaped into loaves without hardening. In addition, the high pentosan content proves to be advantageous from a nutritional point of view, in particular for celiac disease patients, as pentosans cannot be cleaved and thus not be utilized by the human digestive system, but rather contribute to intestinal health in the form of dietary fibers.

The gluten-free baked goods prepared form the above-mentioned baking mixes have a pentosan content of 0.1 to 25%, preferably 6 to 10%, preferably 8 to 15%, preferably 9 to 18%, and a starch content of 25 to 70%, preferably 50 to 65%, preferably 55 to 60%, and optionally a protein content of 5 to 20%, preferably 6 to 10%, preferably 8 to 9%, wherein the various ranges of pentosan content, starch content and optional protein content can be freely combined and adjusted by suitable recipes, which can be calculated on the basis of the starting substances by the person skilled in the art.

Moreover, baked goods prepared from the baking mix of the present invention are characterized in that the produced gluten-free baked goods have a total content of at least 0.1 to 25%, preferably 0.1 to 2,5%, also preferably 0.1 to 5%, also preferably 1 to 10%, also preferably 1.5 to 15%, also preferably 1.5 to 20%, also preferably 2.5 to 25% or also preferably 2 to 20% per kg, wherein said pentosan contents can be present in free combination with the above-indicated protein and starch contents.

is According to further embodiments, the gluten-free baked goods prepared from the above-mentioned baking mixes may contain further ingredients, e. g. seeds (sunflower seeds, pumpkin seeds, linseed, nuts) and sprouts and/or various bread spices, in order to obtain a variety of tastes.

BRIEF DESCRIPTION OF THE DRAWINGS

FIG. 6 shows the increase of the specific bread volume depending on the pentosan content, wherein

Further advantages and applications of the present invention are illustrated by way of the following Examples with reference to the accompanying drawings.

The following Examples are not intended to limit the scope of the present invention in any respect. Rather, within the scope of the description of the Examples, also those variants, elements and combinations are to be considered as disclosed which result from the combination or variation of individual features contained in the general description, the Examples, the claims or the drawings, unless said combinations or variations of features are specifically shown or described in an embodiment and could possibly lead to an altered object of the invention or to novel method steps or a novel sequence of method steps.

EXAMPLES

Each of the following recipes and analyses was carried out according to the standard production method described herein.

In this method, the raw materials were weighed and subsequently weighed into a spiral kneader. The doughs are kneaded at a low speed (30 Hz) for the first 5 minutes and then at a high speed (55 Hz) for another 10 seconds. Subsequently, the doughs are weighed out to give portions of 1,000 g each. The countertop is dusted with potato starch to prevent the doughs from adhering to the countertop in the rounding process.

Subsequently, the loaves are subjected to a unit fermentation process for 40 minutes at 85% relative humidity and 32° C. The duration of the baking process at 230° C. is 60 minutes. It is furthermore possible to divide the baking process (initial baking temperature T=240° C., general baking temperature T=220° C.). Upon introduction into the oven, the loaves must be treated with a considerable amount of steam in order to minimize a tearing of the crumb surface.

Prior to physical/chemical analysis, the loaves were allowed to cool for 24 hours.

In the recipes for the baking mix for gluten-free baked goods described in the following, the ratio of pentosan to starch is adjusted to ratios of pentosan to starch of 1:5, 1:7, 1:10, 1:13,5, 1:15, 1:20, 1:25 and 1:30 using gluten-free raw materials. Thus, a baking mix will be provided that allows for baking gluten-free bread without the addition of baking agents or hydrocolloids. Moreover, it is of importance to produce a dough quality that allows for baking free-form loaves.

Example 1

The basic composition of the baking mix is computationally adjusted to 4 to 10% pentosan (as related to the indications given in the literature) and 45 to 65% starch.

Mix A
42% defatted rapeseed flour
42% corn starch
16% bean flour

Mix B
42% defatted linseed flour
42% potato starch
16% bean flour

Mix C
74% quinoa flour
19% wheat starch, gluten-free
7% lupine flour

Figure 2:
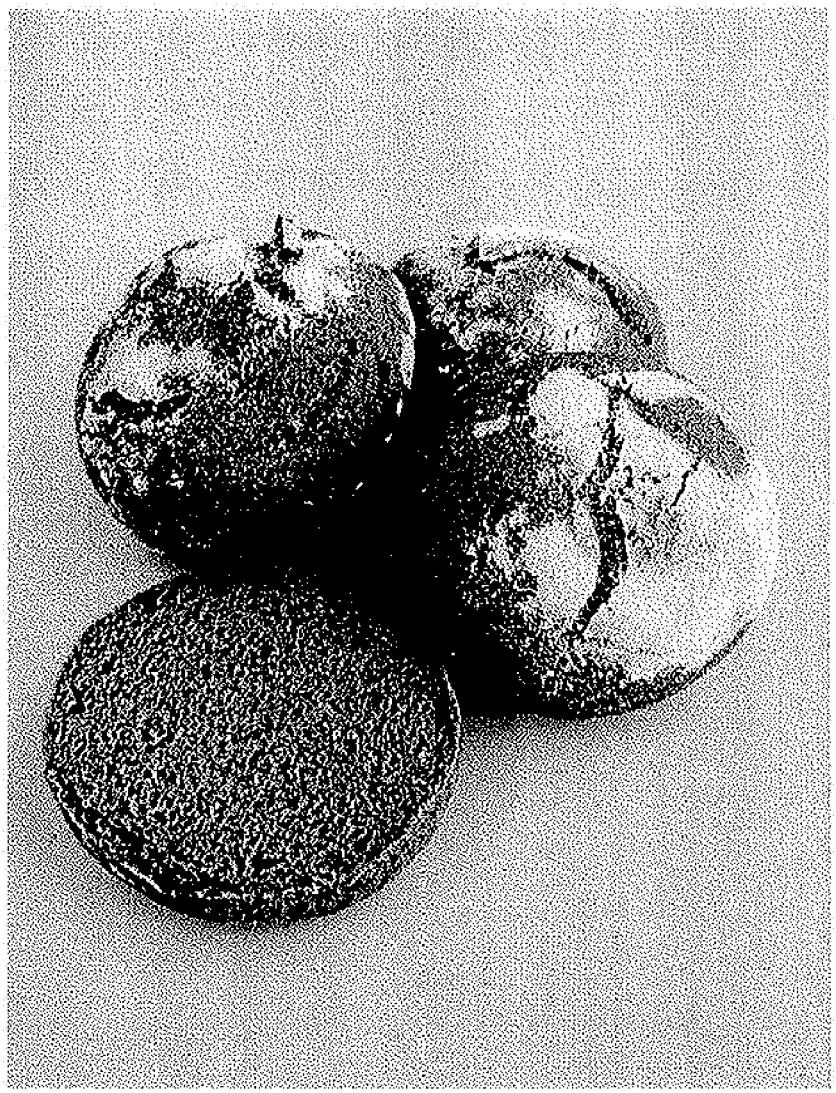
FIG. 2 shows rye-wheat rolls prepared with mix B.

Mix D
42% defatted sunflower seed flour
42% pregelatinized rice flour
7% soy flour Rye-Wheat Rolls Prepared from Mix B (FIG. 2)

Dough is prepared from 700 g of Mix B, 300 g corn flour, 30 g baker's yeast and 20 g salt at a dough yield (d.y.) of 200 in a spiral kneader by means of slow stirring for 5 minutes. Subsequently, about 80 g to 100 g of the dough are shaped into round dough pieces. The dough pieces are then subjected to a fermentation process for 30 minutes at 31° C. and 85% relative humidity and are baked for about 30 minutes and at 230° C. top and bottom heat while being treated with steam.

Hamburger Buns Prepared from Mix A

For producing hamburger buns, a dough is prepared from 600 g of Mix A, 400 g corn starch, 140 g sugar, 125 g corn flour, 70 g shortening, 10 g sodium stearoyl-2-lactylat, 50 g baker's yeast and 20 g salt at a dough yield (d.y.) of 165 in the spiral kneader by means of slow stirring for 5 minutes. The dough is left to rest for 10 minutes before it is shaped into round dough pieces of 100 g each. The round dough pieces are put onto a hamburger bun tray and subjected to a fermentation process for 1 hour at 36° C. and 85% relative humidity until they are finally baked for 15 to 20 minutes in a rack oven at 250° C. bottom heat and 240° C. top heat with an initial steam treatment.

Toast Prepared from Mix C

Dough is prepared from 1,000 g of Mix C, 10% of which were previously leavened with a rice sourdough starter, 50 g baker's yeast, 50 g shortening, 30 g whole milk powder, 20 g salt and 20 g sugar at a dough yield (d.y.) of 160 in the spiral kneader by means of slow stirring for 5 minutes. Subsequently, the dough is weighed into toast baking pans (depth 9 cm, internal width: 10.5 cm, external length: 23 cm) in portions of 1,200 g. The dough portions are then transferred to a fermentation chamber with 31° C. and 85% relative humidity for 30 minutes and are subsequently baked (under vigorous initial steam treatment) at 230° C. top and bottom heat.

Muffins Prepared from Mix A

Dough is prepared from 220 g shortening, 220 g sugar, 8 g vanilla sugar, 3 eggs, 500 g of Mix D, 30 g baking agent and 200 ml milk. The dough is filled into greased muffin baking pans and is baked for 15 to 20 minutes at 180° C. top and bottom heat in a baking oven.

For all baked goods prepared from Mixes A to C, an improved bread texture with a medium pore size can be obtained.

Example 2

Rolls for Fast Baking in the Microwave Oven

Dough is prepared from 30 g of a mixture consisting of 62.5% of Mix B, 26% rice flour, 11% dried quinoa sourdough, 1% salt, 1.5% sodium hydrogen carbonate and 30 ml of water in a microwavable container and is subsequently baked for 1.5 minutes at 600 Watts in a microwave oven. Here, the flavor is mainly provided by the dried sourdough. Larger batches may also be prepared.

Example 3

The basic composition of the baking mix is adjusted to 2 to 8% pentosan (computationally related to the indications given in the literature) and 25 to 55% starch.

Bread Recipe of the Type "Rye-Wheat Bread" (Mix E)

Figure 3A:
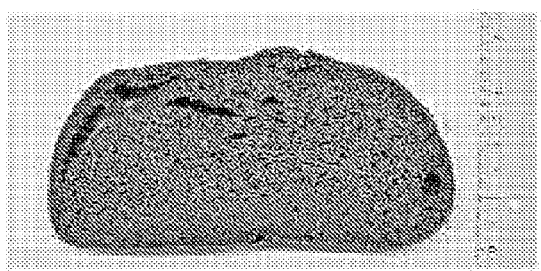
FIG. 3 shows one loaf of bread according to the present invention without sourdough (a) and one loaf of bread according to the present invention with 30% of the flour content leavened (b).
Figure 3B:
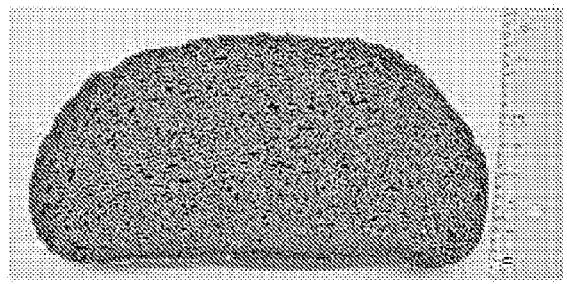
Figure 4A:
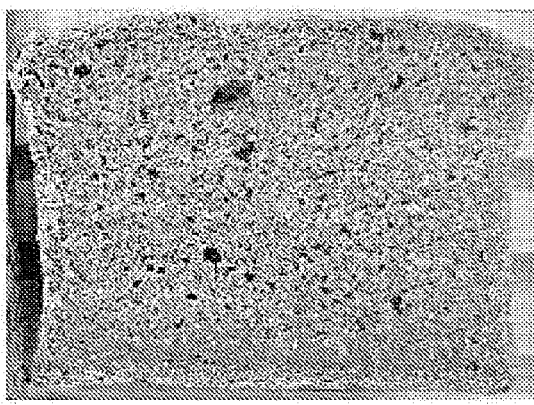
FIG. 4 shows the result of a standard bread mix on the basis of linseed flour (defatted) with a dough yield (d.y.) (for the German "TA") of 182 (a) and the result of a standard bread mix on the basis of linseed flour (defatted) with a dough yield (d.y.) of 195 (b).
Figure 4B:
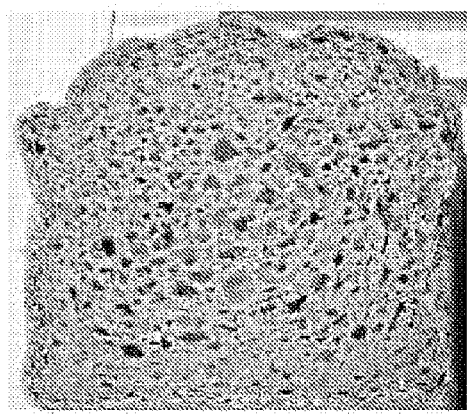

In order to prevent the separation of the crumb from the crust of the loaf and the formation of a not thoroughly baked streak, gummy streak (for German "Klitschstreifen"), 30% of the total flour content are leavened (FIG. 3a—without leavening, FIGS. 3b—30% of the flour content leavened, one-step leavening for 18 h at 28° C., dough yield (d.y.) 250).

70% Mix B (according to Example 1)
30% rice flour
2% salt
3% yeast
Bread dough yield: 220

The recipe ingredients are weighed out and slowly kneaded for 5 min. After a resting period of 10 min, the dough is divided, formed and put into proofing baskets. Subsequently to a fermentation period of 40 min at 32° C. (85% rel. hum.) the dough pieces are turned over, treated with a spiked roller and put into the oven. The oven temperature is set at 230° C. top heat and 240° C. bottom heat. Vigorous steaming is carried out. After 10 minutes, the oven temperature is reduced to 210° C. (top and bottom heat). Baking time is 60 minutes. The acidity of the bread with 30% leavening is 8.3.

Figure 1:
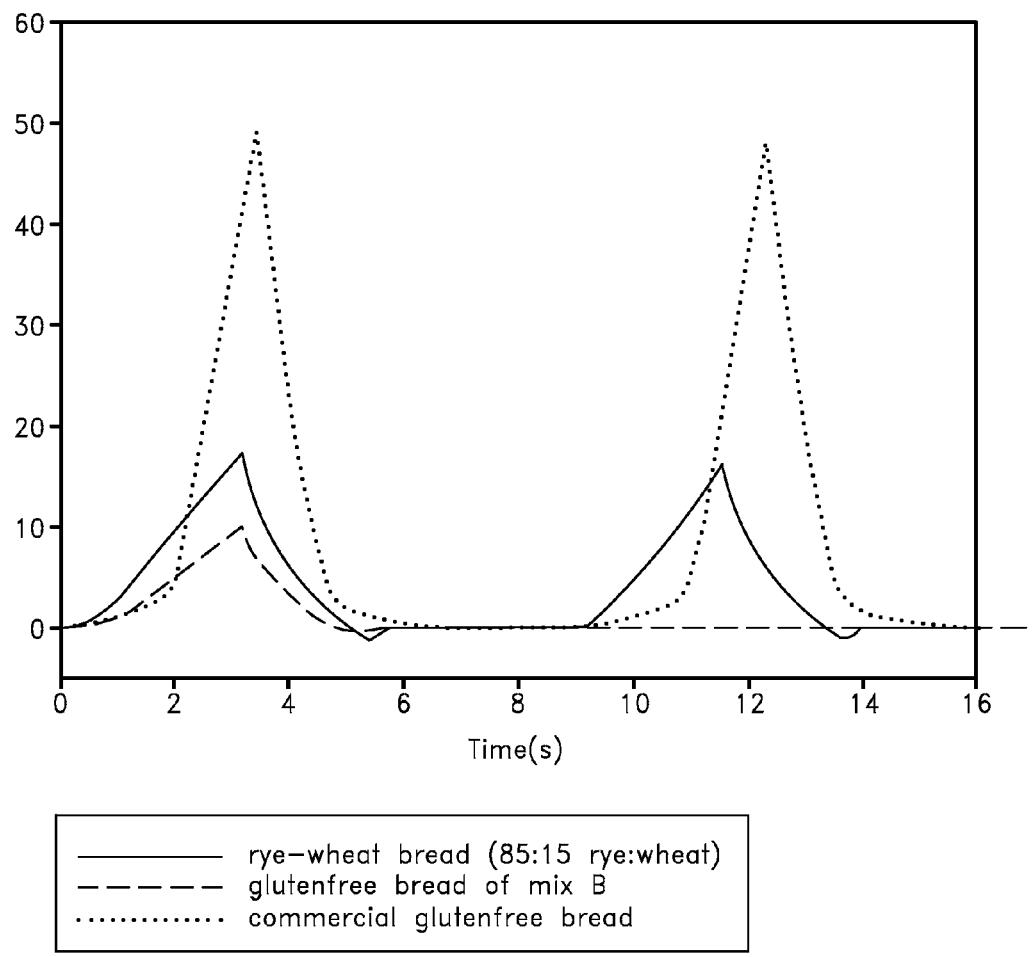
FIG. 1 shows the result of a Texture Profile Analysis for the characterization of crumb textures. As can be seen in the Figure, commercially available gluten-free bread has a very firm crumb and does not have the elasticity and softness that is characteristic of wheat, rye and rye-wheat bread. It can be seen from the divided curve progression of the commercially available, gluten-free sliced bread that it has a very firm and brittle crumb structure. In comparison, the rye-wheat bread (85:15 rye:wheat) is softer and has a higher elasticity. The curve progression of the bread prepared according to the present invention, as determined by TPA (Texture Profile Analysis), is similar to that of rye-wheat bread.

Mix F
37% quinoa flour
37% quinoa bran
19% wheat starch (gluten-free)
7% lupine flour
Baking, dough yield (d.y.) 160 for free-form bread, higher for pan-baked bread Mix G
70% rice bran
22% corn starch
8% chickpea flour
Bread, dough yield (d.y.) 176 for free-form bread For all baked goods prepared from the Mixes E to G, a significantly improved bread textures and volumes are determined. It is to be noted that the baked product similar to rye-wheat bread that was prepared from Mix B also has an improved crumb; also see the TPA results in FIGS. 1 and 3b.

Furthermore, the data obtained from the analytical flour determination show that the recipes fulfill the requirements of the present invention. In addition to the starch content (ICC Standard 168) and the pentosan content (Hashimoto et al., 1987), the gelatinization temperature and the gelatinization maximum, respectively, were determined using the amylograph described in the following.

The gelatinization properties of a flour/water suspension during the heating process, presented on the basis of viscosity alteration, can be assayed using a rotary viscometer, according to ICC Standard Nr. 126/1. A suspension of flour in water is heated in a measuring pot rotating at a constant velocity and having constant rate of heating (1.5 K/min). The flours are weighed in according to the requirements for rye flour in portions of 80 g each. The viscosity of the gel thus obtained is continuously recorded on the rotary viscometer.

The maximum viscosity determined in the amylograph during measurement shows the gelatinization properties of the suspensions and thus gives information on the texture and water absorption capacity of the pentosans and on the baking behavior of the flours.

|  | Total pentosan content, as measured %/dry matter | Starch %//dry matter | Ratio of starch to pentosan, as calculated | Gelatinization temperature (amylograph, ° C.) | Gelatinization maximum (amylograph units) |
|---|---|---|---|---|---|
| Whole rye flour | 2.2 | 46.8 | 21.3 | 69.87 | 890 |
| Mix A | 2.2 | 34.8 | 15.8 | 79.2 | 828 |
| Mix B | 2.8 | 26.9 | 9.6 | 73.8 | 2906 |
| Mix C | 2.6 | 52.7 | 20.2 | 92.4 | 1548 |
| 70% rice bran 22% corn starch 8% chick pea flour | 2.5 | 22.1 | 8.84 | 96.0 | 129 |
| 70% rice bran 22% potato starch, 8% bean flour | 2.8 | 18.8 | 6.7 | 90 | 3 7 3 |

Example 4

Rice Bran as an Alternative Pentosan Source

Rice bran as an alternative pentosan source for gluten-free bread (free-form) Preparation of gluten-free bread based on the original recipe with ground linseed press cake (leavened and unleavened) as compared to bread prepared from rice bran (leavened and unleavened), with and without the addition of sourdough.

Sourdough Leavening:

The sourdoughs were leavened for a total of 48 hours at 28° C. Mature sour: BÖCKER, pure-culture sourdough rice.

| 1 | 2 | 3 | 4 |
|---|---|---|---|
| Linseed flour (standard) | 40% leavened/fermented (linseed mixture) | Rice bran (standard) | 40% leavened/fermented (rice bran mixture) |
| Recipe:<br>628.5 g potato starch<br>628.5 g linseed press cake (ground)<br>240 g bean flour<br>42 g yeast<br>30 g salt<br>1800 g water<br>(dough yield (d.y.) 220) | Recipe:<br>318.8 g potato starch<br>483.26 g linseed press cake (ground)<br>122.19 g bean flour<br>42 g yeast<br>30 g salt<br>1243.86 ml water +<br>600 g sourdough<br>(dough yield (d.y.) 234)<br>Sourdough:<br>341.2 g potato starch<br>160 g linseed<br>129.78 g bean flour<br>63 g rice starter<br>830 g water<br>→ dough yield (d.y.) 231<br>T = 28° C. | Recipe:<br>331.05 g potato starch<br>1042.5 g rice bran<br>126.15 g bean flour<br>42 g yeast<br>30 g salt<br>1308.42 g water<br>(dough yield (d.y.) 187) | Recipe:<br>306.44 g potato starch<br>972.24 g rice bran<br>116.79 g bean flour<br>42 g yeast<br>30 g salt<br>1238.79 ml water +<br>220 g sourdough<br>(dough yield (d.y.) 196)<br>Sourdough:<br>341.2 g potato starch<br>974 g rice bran<br>129.78 g bean flour<br>63 g rice starter<br>1575 g water<br>→ dough yield (d.y.) 350<br>T = 28° C. |
| → Pan-baked and free-form | → Pan-baked and free-form | → Pan-baked and rolls | → Pan-baked and rolls |

Sourdough Analysis

|  | pH-Wert | Degree of Acidity Sr° |
|---|---|---|
| Sourdough 1 (linseed) after 24 h | 4.52 | 12.8 |
| Sourdough 2 (bran) after 24 h | 4.92 | 22.8 |
| Sourdough 1 after 48 h | 4.48 | 14.0 |
| Sourdough 2 after 48 h | 4.45 | 28.45 |

Evaluation

| Bread | v (ml/g) |
|---|---|
| 1 Linseed without sourdough | 1.35 |
| 2 Linseed with sourdough | 1.30 |
| 3 Rice bran without sourdough | 1.30 |
| 4 Rice bran with sourdough | 1.38 |

Example 5

Further Pentosan Sources

Quinoa flour+quinoa bran, rice bran and linseed press cake (ground) are combined in recipes, so that theoretically 100 g of pentosan are present in each recipe (and the ratio of starch to pentosan is about 80:10); furthermore, 8 to 9 g of protein are present.

Recipe 1
630 g linseed press cake (ground) (42%)
630 g potato starch (42%)
240 g bean flour (16%)
45 g yeast (3% based on flour (a.M-B))
30 g salt (2% based on flour (a.M-B))
+1,800 g water (dough yield d.y. 220)

Recipe 2
1110 g quinoa flour (74%) (555 quinoa flour (37%)+555 quinoa bran (37%))
280.5 g potato starch (19%)
100.8 g bean flour (7%)
45 g yeast (3% based on flour (a.M-B))
30 g salt (2% based on flour (a.M-B))
+900 g water (dough yield (d.y.) 160)

Recipe 3
1,050 g rice bran (70%)
330 g potato starch (22%)
125.4 g bean flour (8%)
45 g yeast (3% based on flour (a.M-B))
30 g salt (2% based on flour (a.M-B))
+1,139 g water (dough yield (d.y.) 176)

Figure 5:
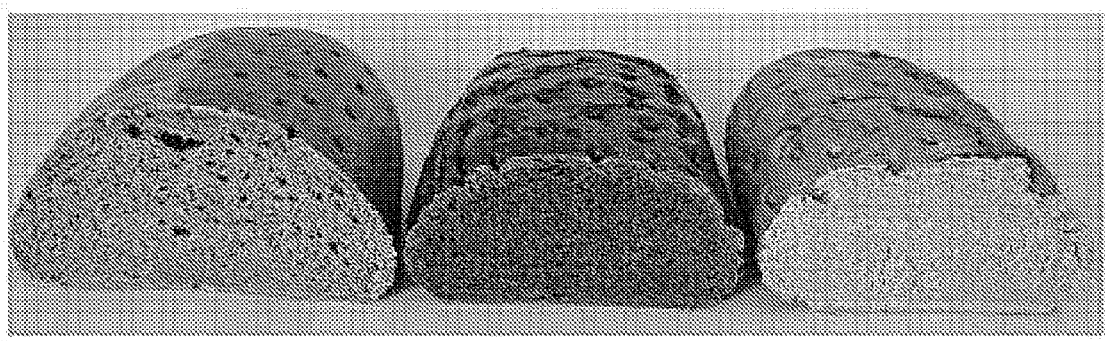
FIG. 5 shows three free-form baked, gluten-free loaves of bread on the basis of linseed (left), quinoa flour and bran (center) and rice bran (right).
Figure 6A:
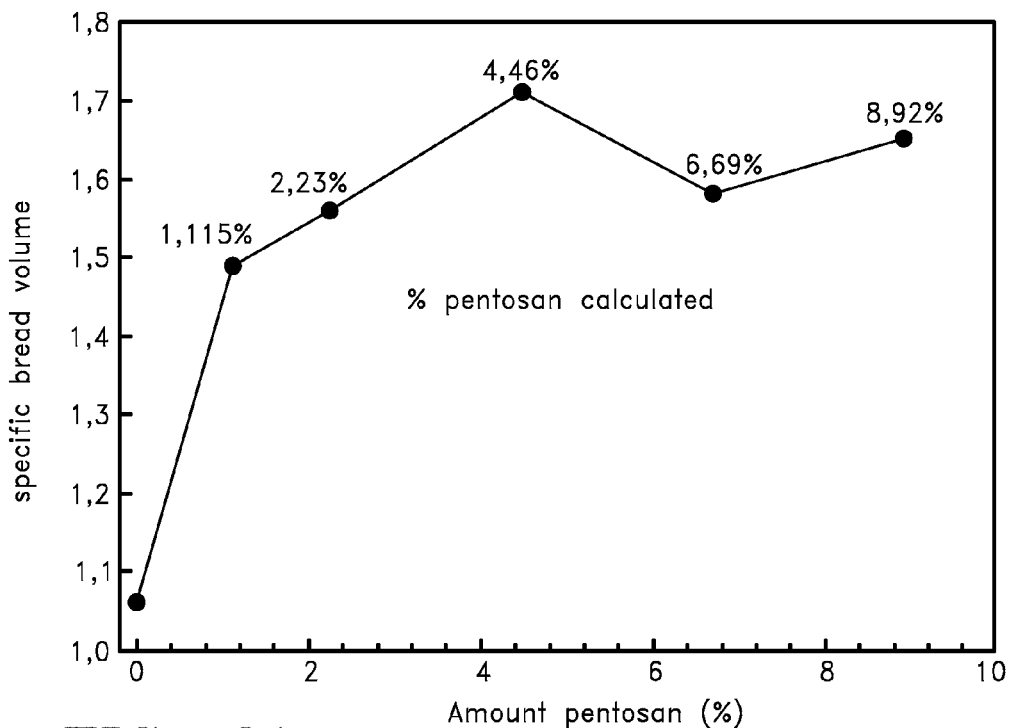
FIG. 6a is based on the value according to the literature, with 22.3% of pentosan in defatted linseed flour.
Figure 6B:
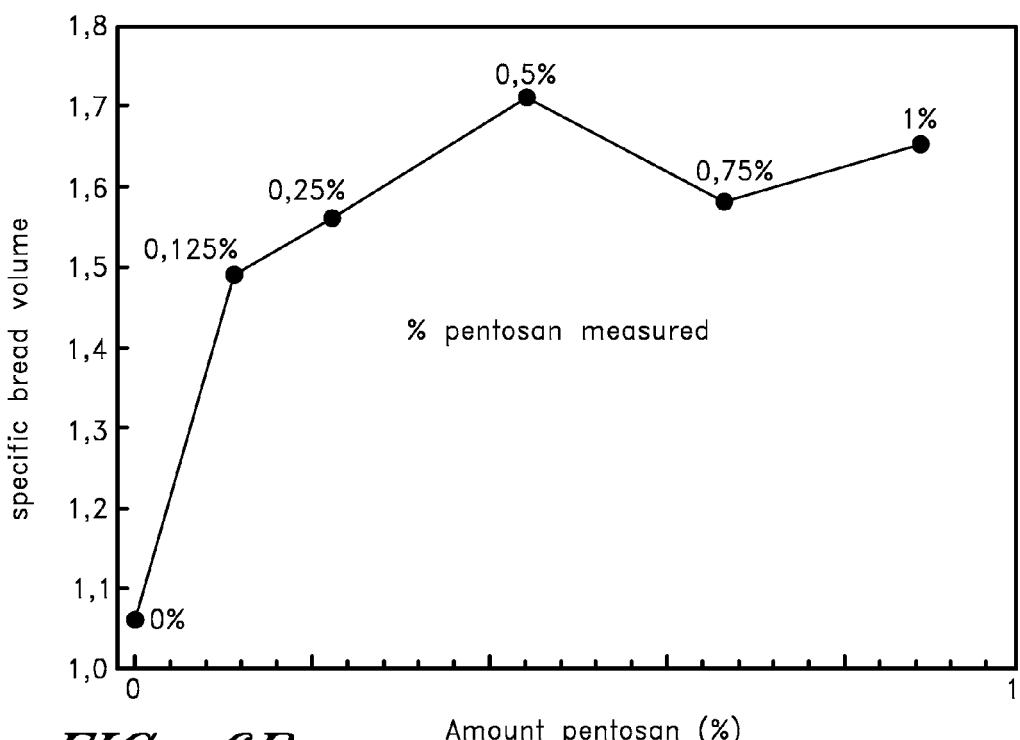
FIG. 6b shows the values measured according to the Hashimoto method for determining the pentosan content obtained with the same dough compositions as in FIG. 6a. In the preparation of the different doughs, mix B of Example 1 was in each case altered with respect to the amount of defatted linseed flour added. The basic value of the pentosan content of defatted linseed flour according to the literature is 22.3%; however, the value measured according to the Hashimoto method was only 2.5%.

The dough yield (d.y.) is not equally applicable to all raw materials; water absorption also differs and has to be adapted. The comparatively best crumb texture is obtained with quinoa flour and quinoa bran (very soft and very elastic crumb) (FIG. 5).

The invention claimed is:

1. A gluten-free baking mix comprising at least one gluten-free starch source and at least one gluten-free pentosan source, wherein the ratio of starch to pentosan in the gluten-free baking mix is in the range of 8:1 to 30:18 and the pentosan source is selected from the group consisting of ground oil seeds, corn oil pressing residues, rapeseed oil pressing residues, sunflower oil pressing residues, linseed oil pressing residues, and mixtures thereof;
   further comprising a sourdough comprising *Lactobacilli* selected from the group consisting of *Lactobacillus plantarum, L. fermentum, L. paracasei, L. paralimentarius, L. helveticus, Leuconostoc argentinum* and mixtures thereof;
   wherein said pentosan source is ground to less than 500 μm; and,
   wherein a gluten-free baked good made from said gluten-free baking mix comprises a pentosan content of 5 to 20%, a starch content of 25 to 70%, and a protein content of 5 to 10%.

2. The gluten-free baking mix according to claim 1, wherein the starch source is selected from the group consisting of ground corn starch, potato starch, sweet potato starch, rice starch, pea starch, manioc starch, sorghum and mixtures thereof.

3. The gluten-free baking mix according to claim 1, wherein the baking mix has a determinable total starch content of at least 25%.

4. The gluten-free baking mix according to claim 1, wherein the baking mix additionally comprises at least one gluten-free protein source selected from the group consisting of ground lupines, ground chickpeas, ground beans, ground field beans, milk powder, whey powder, powdered egg and mixtures thereof.

5. The gluten-free baking mix according to claim 1, further comprising a pentosan-degrading enzyme or acid.

6. A gluten-free baked good prepared from the gluten-free baking mix of claim 1.

7. The gluten-free baked good according to claim 1, wherein the baked good comprises bread spices and/or seeds.

8. A method for producing a gluten-free bread, comprising:
(a) providing the gluten-free baking mix of claim 1;
(b) preparing dough from said baking mix; and
(c) baking free-form loaves of bread with said dough, wherein a specific bread volume of at least 1.2 ml/g and/or, a ratio of width to height of at least 1.5 is achieved.

9. A free-form baked, gluten-free bread, obtained by the method according to claim 8, wherein the bread has a pentosan content of 5 to 20%, a starch content of 25 to 70% and a protein content of 5 to 10%.

10. The method according to claim 8, wherein the free-form loaves of bread are baked in serving sizes in a microwave oven.

* * * * *